(12) United States Patent
Barker

(10) Patent No.: US 11,447,328 B2
(45) Date of Patent: *Sep. 20, 2022

(54) BICYCLE PACKAGING

(71) Applicant: Pratt Corrugated Holdings, Inc., Brookhaven, GA (US)

(72) Inventor: Larry Barker, McDonough, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/941,626

(22) Filed: Jul. 29, 2020

(65) Prior Publication Data
US 2020/0354141 A1 Nov. 12, 2020

Related U.S. Application Data

(63) Continuation of application No. 16/031,718, filed on Jul. 10, 2018, now Pat. No. 10,766,691.

(51) Int. Cl.
*B65D 85/68* (2006.01)
*B65D 5/66* (2006.01)
(Continued)

(52) U.S. Cl.
CPC ............... *B65D 85/68* (2013.01); *B65B 5/00* (2013.01); *B65B 5/04* (2013.01); *B65B 25/24* (2013.01);
(Continued)

(58) Field of Classification Search
CPC .......... B65D 85/68; B65D 5/32; B65D 5/665; B65D 2585/6862; B65D 5/5059;
(Continued)

(56) References Cited

U.S. PATENT DOCUMENTS

| 657,688 A | 9/1900 | Beers |
|---|---|---|
| 1,449,374 A | 3/1923 | Bonfield |

(Continued)

FOREIGN PATENT DOCUMENTS

| EP | 1849717 | 10/2007 |
|---|---|---|
| EP | 2239210 | 10/2010 |

(Continued)

OTHER PUBLICATIONS

Barker, Larry; Final Office Action for U.S. Appl. No. 16/031,718, filed Jul. 10, 2018, dated Mar. 23, 2020, 19 pgs.

(Continued)

*Primary Examiner* — J. Gregory Pickett
*Assistant Examiner* — Jenine Pagan
(74) *Attorney, Agent, or Firm* — Taylor English Duma LLP

(57) ABSTRACT

Example aspects of bicycle packaging and a method of assembling bicycle packaging are disclosed. The method of assembling bicycle packaging can comprise providing a first packaging body, the first packaging body comprising a first side panel, a first top panel connected to the first side panel at a first bend line, and a primary tab extending from an outward edge of the first top panel distal to the first bend line; providing a second packaging body, the second packaging body comprising a second side panel, a second top panel connected to the second side panel at a second bend line, and a secondary tab connected to the second side panel; engaging the primary tab with a primary slot formed at the second bend line; and engaging the secondary tab with a secondary slot formed at the outward edge of the first top panel.

20 Claims, 12 Drawing Sheets

(51) Int. Cl.
  *B65D 5/32* (2006.01)
  *B65B 25/24* (2006.01)
  *B65B 5/04* (2006.01)
  *B65B 5/00* (2006.01)
  *B65B 7/24* (2006.01)

(52) U.S. Cl.
  CPC .............. *B65D 5/32* (2013.01); *B65D 5/665* (2013.01); *B65B 7/24* (2013.01); *B65D 2585/6862* (2013.01)

(58) Field of Classification Search
  CPC ........... B65D 5/6658; B65B 5/00; B65B 5/04; B65B 7/24; B65B 25/24
  USPC ....................................................... 206/335
  See application file for complete search history.

(56) References Cited

U.S. PATENT DOCUMENTS

| | | | |
|---|---|---|---|
| 1,876,982 A | 9/1932 | Lichter | |
| 2,203,127 A | 6/1940 | Borah | |
| 2,209,796 A | 7/1940 | Snelling | |
| 2,299,355 A | 10/1942 | Stolpman | |
| 2,306,328 A | 12/1942 | Biberthaler | |
| D136,489 S | 10/1943 | Geffner | |
| 2,339,947 A | 1/1944 | Reaume | |
| 2,570,973 A | 10/1951 | Nelson | |
| 2,629,487 A | 2/1953 | Kells | |
| 2,670,892 A | 3/1954 | Kendrick | |
| 2,750,097 A | 6/1956 | Moore | |
| 2,883,042 A | 4/1959 | Richer | |
| 3,259,295 A * | 7/1966 | Butz | B65D 5/32 229/110 |
| 3,929,225 A | 12/1975 | Locke et al. | |
| 4,149,634 A | 4/1979 | Lewis, Jr. et al. | |
| 4,378,883 A | 4/1983 | Profeta | |
| 4,469,224 A | 9/1984 | Ritter | |
| 4,693,289 A | 9/1987 | Taylor et al. | |
| 4,917,290 A | 4/1990 | Saiki et al. | |
| 5,040,721 A | 8/1991 | Essack | |
| D319,667 S | 9/1991 | Gray | |
| 5,328,033 A | 7/1994 | Ptaschinski | |
| 5,520,280 A | 5/1996 | Lickton | |
| 5,669,497 A | 9/1997 | Evans et al. | |
| 5,860,555 A * | 1/1999 | Mayled | A61B 50/36 229/148 |
| 6,039,243 A | 3/2000 | Lickton | |
| D433,942 S | 11/2000 | Persson et al. | |
| 6,267,237 B1 | 7/2001 | McNeill | |
| D454,494 S | 3/2002 | Bryan et al. | |
| D461,122 S | 8/2002 | Bryan et al. | |
| 6,450,342 B1 | 9/2002 | Ptaschinski | |
| 6,612,483 B2 | 9/2003 | Harris et al. | |
| 6,857,533 B1 | 2/2005 | Jackson | |
| D505,321 S | 5/2005 | Bechard | |
| 6,926,192 B1 * | 8/2005 | Dowd | B65D 5/445 229/148 |
| 6,926,196 B2 | 8/2005 | Testerman et al. | |
| D519,833 S | 5/2006 | Katsuyama | |
| D525,121 S | 7/2006 | Katsuyama | |
| D526,572 S | 8/2006 | Lemaire | |
| D560,493 S | 1/2008 | Katsuyama | |
| D562,679 S | 2/2008 | Katsuyama | |
| D564,794 S | 3/2008 | Ehresman | |
| D567,078 S | 4/2008 | Katsuyama | |
| 7,431,159 B2 | 10/2008 | Lawrence et al. | |
| 7,673,787 B2 | 3/2010 | Mittelstaedt | |
| D657,238 S | 4/2012 | Neufeldt | |
| D712,276 S | 9/2014 | Irek | |
| 9,481,487 B2 | 11/2016 | Dean et al. | |
| D788,579 S | 6/2017 | Ogdon et al. | |
| 10,017,292 B1 | 7/2018 | Anderson et al. | |
| D848,278 S | 5/2019 | Duck et al. | |
| D873,657 S | 1/2020 | Barker | |
| 10,766,691 B2 | 9/2020 | Barker | |
| D911,164 S | 2/2021 | Barker | |
| 2009/0314826 A1 * | 12/2009 | Lee | B65B 23/00 53/472 |
| 2010/0025455 A1 | 2/2010 | Pan | |
| 2011/0195164 A1 | 8/2011 | Drury | |
| 2016/0068296 A1 | 3/2016 | Dammeyer | |
| 2016/0194111 A1 | 7/2016 | Sharon et al. | |
| 2017/0066588 A1 | 3/2017 | Schreiber et al. | |
| 2018/0093819 A1 | 4/2018 | Chen et al. | |
| 2018/0194511 A1 | 7/2018 | Anderson et al. | |
| 2018/0290820 A1 | 10/2018 | Keiller | |
| 2020/0017285 A1 | 1/2020 | Barker | |
| 2020/0017286 A1 | 1/2020 | Barker | |

FOREIGN PATENT DOCUMENTS

| | | |
|---|---|---|
| FR | 1394973 | 4/1965 |
| FR | 2678588 | 1/1993 |
| GB | 2345691 | 7/2000 |
| WO | 9919197 | 4/1999 |

OTHER PUBLICATIONS

Barker, Larry; Non-Final Office Action for U.S. Appl. No. 16/031,718, filed Jul. 10, 2018, dated Jul. 19, 2019, 16 pgs.

Barker, Larry; Notice of Allowance for U.S. Appl. No. 16/031,718, filed Jul. 10, 2018, dated May 29, 2020, 6 ogs.

Barker, Larry; Corrected Notice of Allowance for U.S. Appl. No. 29/656,115, filed Jul. 10, 2018, dated Oct. 11, 2019, 7 pgs.

Barker, Larry; Ex Parte Quayle Action for U.S. Appl. No. 29/656,115, filed Jul. 10, 2018, dated Jun. 21, 2019, 11 pgs.

Barker, Larry; Notice of Allowance for U.S. Appl. No. 29/656,115, filed Jul. 10, 2018, dated Sep. 18, 2019, 5 pgs.

Barker, Larry; Notice of Allowance for Design U.S. Appl. No. 29/717,346, filed Dec. 17, 2019, dated Oct. 27, 2020, 20 pgs.

Barker, Larry; Supplemental Notice of Allowance for Design U.S. Appl. No. 29/171,346, filed Dec. 17, 2019, dated Nov. 25, 2020, 6 pgs.

How Ship Bikes works, [online] Published on Jan. 14, 2019. Retrieved Oct. 7, 2020 from URL: https://www.shipbikes.com/c1Shop1.aspx, 20 pgs.

Taking the new iMac out of its weird-shaped box. [online] Published on Nov. 30, 2012. Retrieved Oct. 7, 2020 from URL: http://macgeeks.com/post/title/taking-the-new-imac-out-of-its-weird-shaped-box, 3 pgs.

Barker, Larry; Supplemental Notice of Allowance for Design U.S. Appl. No. 29/717,346, filed Dec. 17, 2019, dated Jan. 22, 2021, 6 pgs.

"Model K9100 Compact (Basic AirCaddy)", 2012, aircaddy.com, 12pgs, Retrieved from the Internet <URL: https://web.archive.org/web/20120907003444/https://www.shipbikes.com/images/AirCaddy inst. pdf> (Year: 2012), 12 pgs.

Barker, Larry; Non-Final Office Action for U.S. Appl. No. 16/541,284, filed Aug. 15, 2019, dated Dec. 28, 2021, 46 pgs.

Barker, Larry; Final Office Action for U.S. Appl. No. 16/541,284, filed Aug. 15, 2019, dated Apr. 19, 2022, 17 pgs.

* cited by examiner

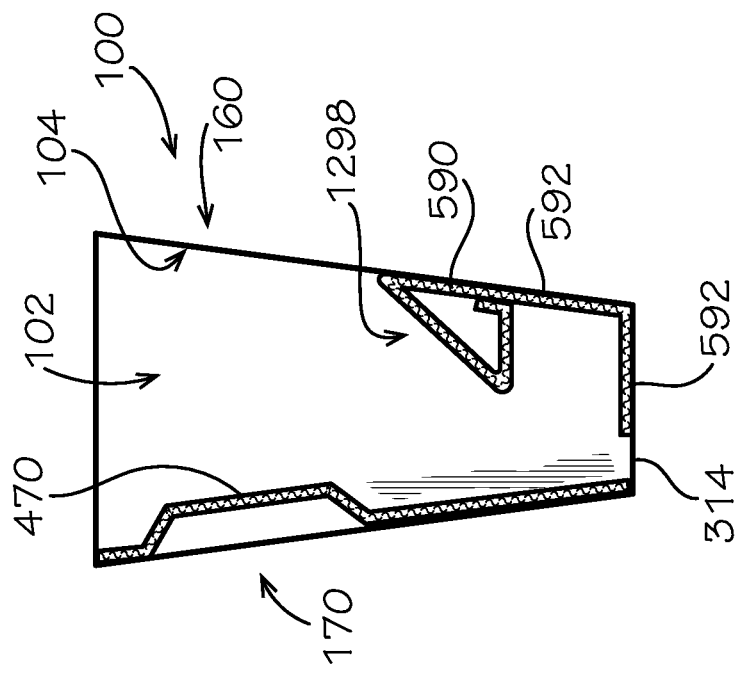
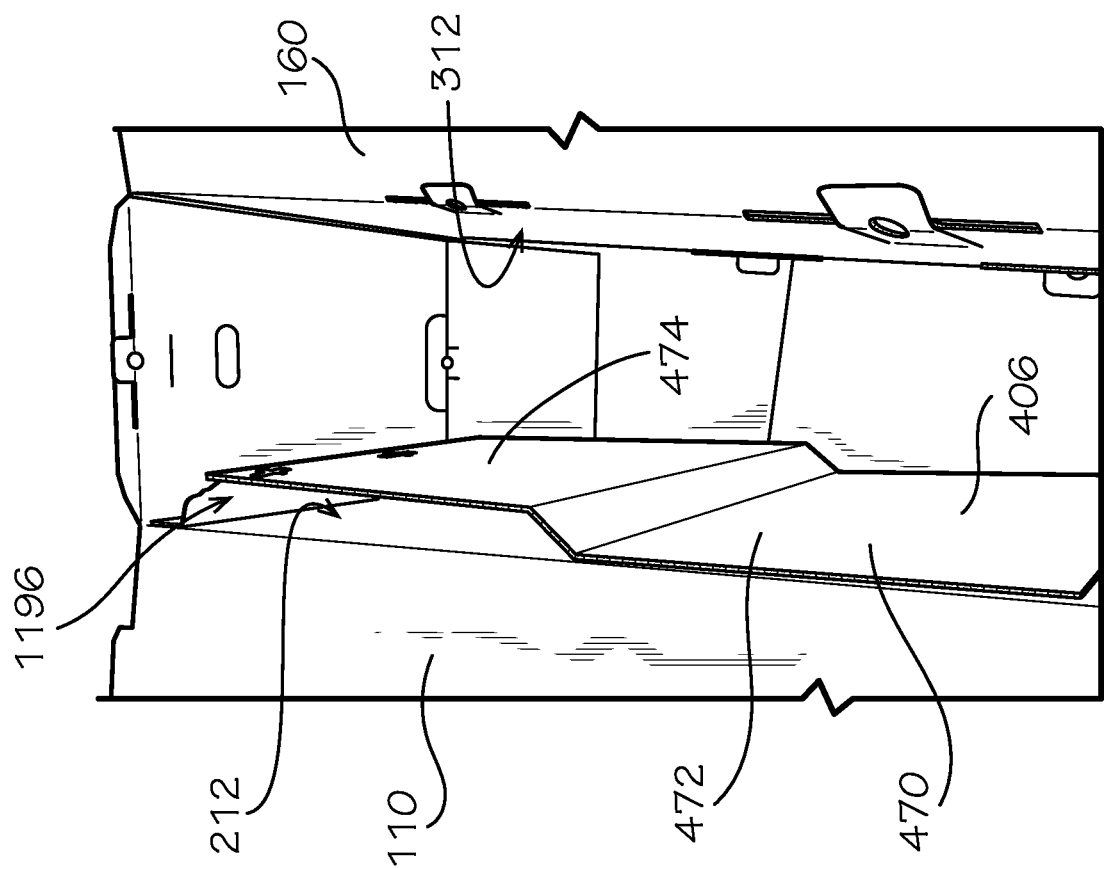

BICYCLE PACKAGING

CROSS-REFERENCE TO RELATED APPLICATIONS

The present application is a continuation of U.S. application Ser. No. 16/031,718, filed Jul. 10, 2018, which is hereby incorporated by reference herein in its entirety.

TECHNICAL FIELD

This disclosure relates to packaging. More specifically, this disclosure relates to packaging for a bicycle.

BACKGROUND

Consumer products are often housed within a packaging during transportation to a consumer. Packaging can prevent damage to the product and can prevent parts of the product from being lost or stolen. Bicycles can be packaged in bicycle packaging. A common bicycle packaging is a partial overlap box. A partial overlap box can comprise a side wall enclosure, an overlapping pair of top flaps, and an overlapping pair of bottom flaps. Typically, the top flaps are secured to one another and the bottom flaps are secured to one another at their overlapping portions with an adhesive, such as glue.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a bicycle packaging comprising a first packaging body comprising a primary fastener and a secondary mating fastener; and a second packaging body comprising a secondary fastener and a primary mating fastener, the first packaging body and second packaging body defining a void, the primary fastener engaging the primary mating fastener, and the secondary fastener engaging the secondary mating fastener.

Also disclosed is a bicycle packaging comprising a first packaging body comprising a first top panel, a first bottom panel, a first side panel, and a first end panel assembly, the first top panel comprising a primary tab and a secondary slot; and a second packaging body comprising a second top panel, a second bottom panel, a second side panel, and a second end panel assembly, the second top panel comprising a primary slot, the primary tab engaging the primary slot, the second side panel comprising a secondary tab, the secondary tab engaging the secondary slot.

Also disclosed is a method for using a bicycle packaging comprising the steps of attaching a first packaging body to a second packaging body to define a void comprising an open end; inserting a bicycle into the void; abutting a first panel of the first packaging body against a second panel of the second packaging body to cover the open end; and engaging a primary fastener of the first panel with a primary mating fastener of the second panel.

Disclosed is a bicycle packaging comprising a first packaging body formed as a first blank, the first blank comprising a first top panel, a first bottom panel, a first side panel, a primary tab, and a first end panel assembly, the first top panel connected to the first side panel at a first bend line, the first bottom panel connected to the first side panel at a second bend line opposite the first bend line, the first end panel assembly connected to the first side panel at a third bend line, the primary tab extending from an outward edge of the first top panel opposite the first bend line, a secondary slot formed at the outward edge; and a second packaging body formed as a second blank, the second blank comprising a second top panel, a second bottom panel, a second side panel, a secondary tab, and a second end panel assembly, the second top panel connected to the second side panel at a fourth bend line, the second bottom panel connected to the second side panel at a fifth bend line opposite the fourth bend line, the second end panel assembly connected to the second side panel at a sixth bend line, the secondary tab connected to the second side panel and configured to engage the secondary slot, a primary slot formed at the fourth bend line and configured to receive the primary tab.

Also disclosed is a method of assembly bicycle packaging comprising providing a first packaging body, the first packaging body comprising a first side panel, a first top panel connected to the first side panel at a first bend line, and a primary tab extending from an outward edge of the first top panel distal to the first bend line; providing a second packaging body, the second packaging body comprising a second side panel, a second top panel connected to the second side panel at a second bend line, and a secondary tab connected to the second side panel; engaging the primary tab with a primary slot formed at the second bend line; and engaging the secondary tab with a secondary slot formed at the outward edge of the first top panel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 11 is a perspective view of the wheel insert of FIG. 4 assembled with first and second packaging bodies of FIG. 1.

FIG. 12 is a top, cross-sectional view of the wheel insert of FIG. 4 and the derailer insert of FIG. 5 assembled with the first and second packaging bodies of FIG. 1 taken along line 2-2 in FIG. 14.

DETAILED DESCRIPTION

Figure 1:
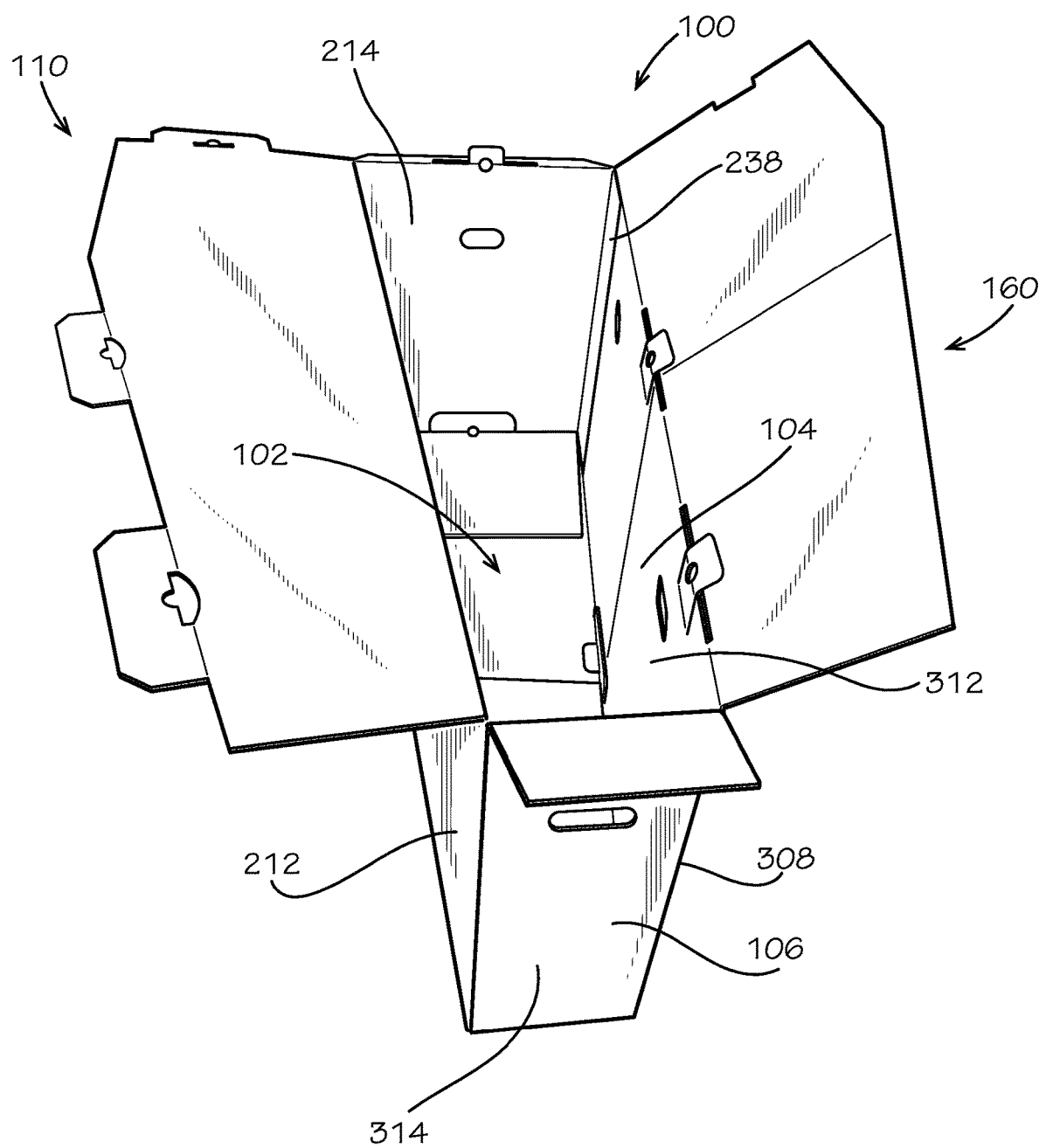
FIG. 1 shows a perspective view of a bicycle packaging comprising a first packaging body and a second packaging body, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a package for a bicycle and associated methods, systems, devices, and various apparatus. Example aspects of the bicycle packaging can comprise a first packaging body and a second package body. The first packaging body and second packaging body can define a void configured to receive a bicycle therein. The bicycle packaging can further comprise a primary fastener and a secondary fastener for coupling the first packaging body to the second packaging body. It would be understood by one of skill in the art that the disclosed bicycle package is described in but a few exemplary aspects among many. No particular terminology or description should be considered limiting on the disclosure or the scope of any claims issuing therefrom.

FIG. 1 illustrates a first example aspect of a bicycle packaging 100. Example aspects of the bicycle packaging 100 can comprise a first packaging body 110, a second packaging body 160 coupled to the first packaging body 110, and a wheel insert 470 (shown in FIG. 4). The first packaging body 110 and second packaging body 160 can define a void 102 for receiving a bicycle (not shown) therein. Each of the first and second packaging bodies 110,160 can comprise an inner surface 104 and an outer surface 106. According to example aspects, portions of the inner surfaces 104 of the first and second packaging bodies 110,160 can define the void 102. The bicycle packaging 100 is shown in FIG. 1 with an open top end for the purpose of visibility into the void 102. Example aspects of the bicycle packaging 100 can be formed from paperboard (e.g., cardboard). Specifically, the bicycle packaging 100 can be formed from corrugated cardboard. Other example aspects can comprise another material, or a combination of materials, including, but not limited to, metal, plastic, wood, paper, fiberboard, containerboard, or any other suitable material known in the art. According to example aspects, each of the first and second packaging bodies 110,160 can be formed as a blank (as shown in FIGS. 2 and 3, respectively) to allow the first and second packaging bodies 110,160 to remain in a flat configuration, taking up minimal space, until the bicycle packaging 100 is assembled for use.

Figure 2:
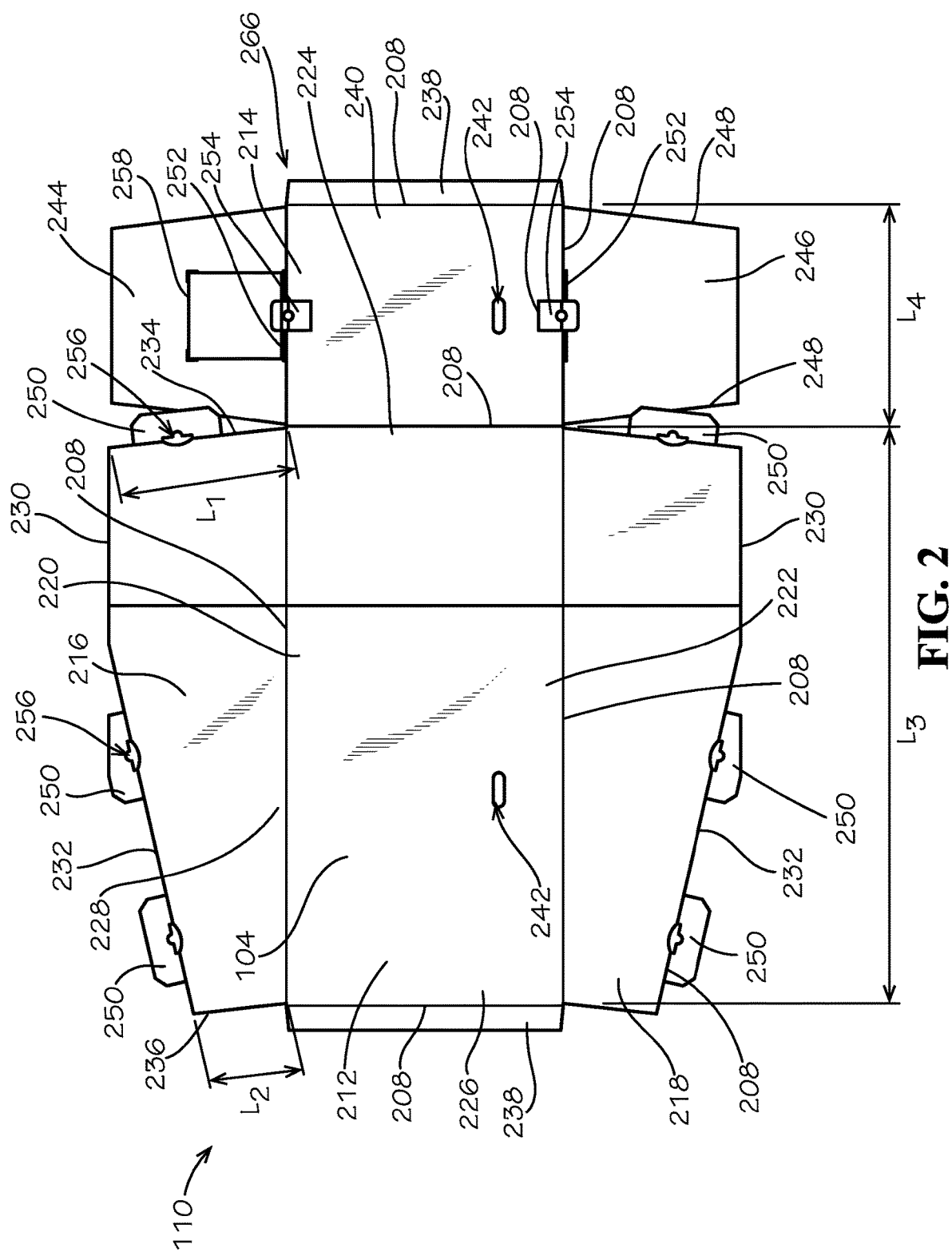
FIG. 2 is a schematic view of the first packaging body of FIG. 1 in blank form.
Figure 3:
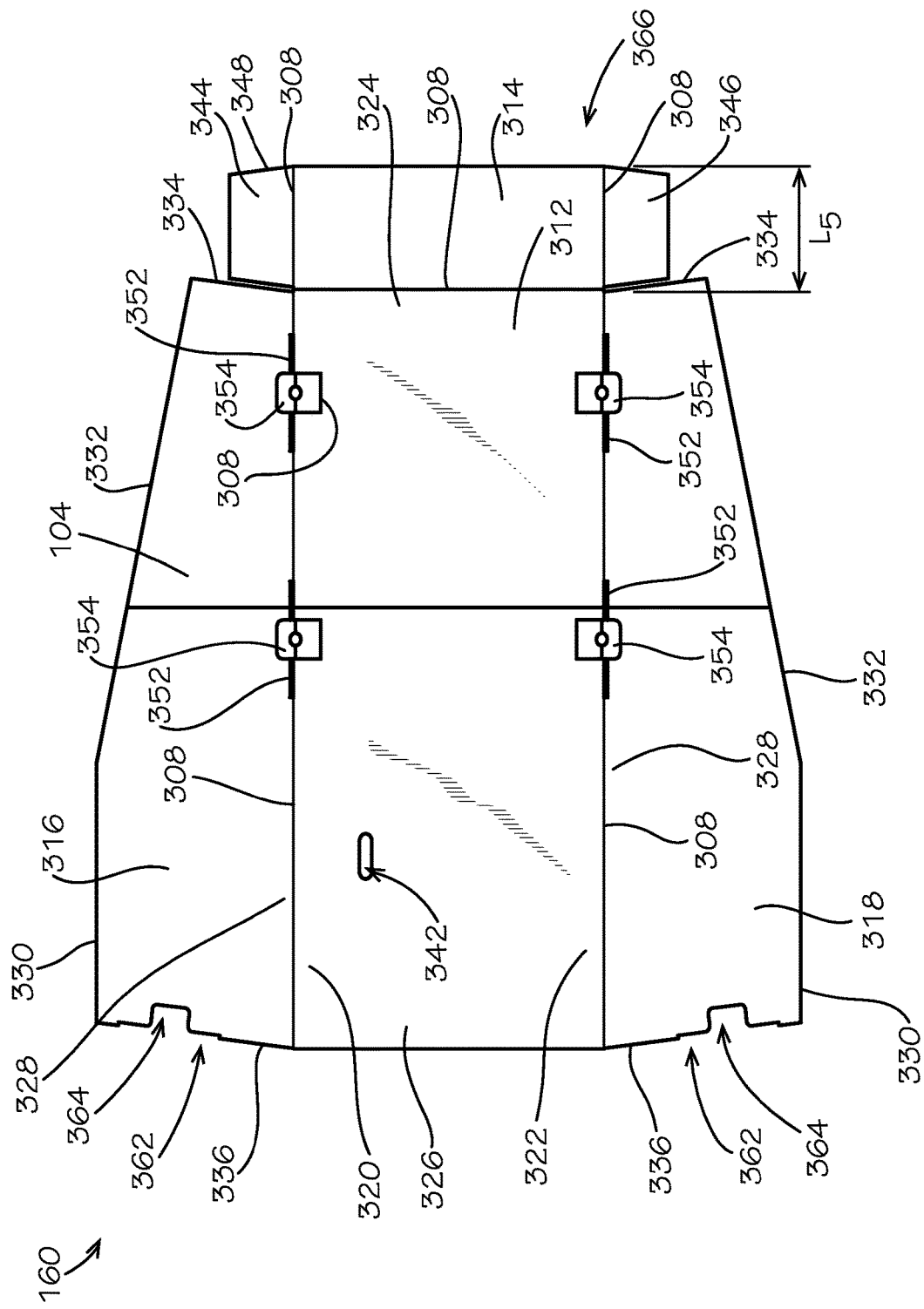
FIG. 3 is a schematic view of the second packaging body of FIG. 1 in blank form.

FIG. 2 illustrates an example aspect of the first packaging body 110, according to the present disclosure. The first packaging body 110 is shown in blank form. The first packaging body 110 can comprise a side panel 212, an end panel assembly 266, a top panel 216, and a bottom panel 218. The end panel assembly can comprise an end panel 214. Further, according to example aspects, the first packaging body 110 can define an inner surface 104 and an outer surface 106 (shown in FIG. 1). The first side panel 212 can define a top end 220, a bottom end 222, a right side end 224, and a left side end 226. References of top, bottom, left, and right in this disclosure are relative to the orientation shown. The top panel 216 can extend from the top end 220, the bottom panel 218 can extend from the bottom end 222, and the end panel 214 can extend from the right side end 224. A bend line 208 can be formed at the connection of each of the end panel 214, top panel 216, and bottom panel 218 to the side panel 212, and can facilitate folding of the end, top, and bottom panels 214,216,218 with respect to the side panel 212. Example aspects of the bend lines 208 can be formed by a crease in the paperboard (or other material in other aspects). Further, in other aspects, the bend lines 208 can be formed by perforations, scoring, or by any other suitable technique for forming bend lines 208 that is known in the art.

Example aspects of the top panel 216 and bottom panel 218 can each comprise an inward edge 228 connected to the side panel 212 at the corresponding bend line 208 and first and second outward edges 230,232 distal from the side panel 212. Each of the top panel 216 and bottom panel 218 can further comprise a right side edge 234 and a left side edge 236. According to example aspects, the right side edge 234 can be oriented at an acute angle relative to the inward edge 228 and the left side edge 236 can be oriented at an angle relative to the inward edge 228. In some aspects, the angle can be obtuse. In other aspects, the angles formed between the right and left side edges 234,236 and the inward edge 228 can differ—for example, in some aspects, the right and left side edges 234,236 can be oriented at a generally right angle relative to the inward edge 228. In still other aspects, both the right and left sides edges 234,236 can be oriented at an acute angle relative to the inward edge 228.

In example aspects of the top and bottom panels 216,218, the first outward edge 230 can between the second outward edge 232 and the right side edge 234, and the second outward edge 232 can extend between the first outward edge 230 and the left side edge 236. As shown, the second outward edge 232 can be oriented at an angle with respect to the first outward edge 230. In example aspects, the first outward edge 230 can extend generally perpendicular to the inward edge 228, and the second outward edge 232 can taper inward along its length from the first outward edge to the left side edge 236. Thus, according to example aspects, a length $L_1$ of the right side edge 234 can be greater than a length $L_2$ of the left side edge 236.

As illustrated, example aspects of the side panel 212 and the end panel 214 can be generally rectangular in shape, and a length $L_3$ of the side panel 212 can be greater than a length $L_4$ of the end panel 214. Each of the side panel 212 and the end panel 214 can comprise a connector strip 238. A first one of the connector strips 238 can extend along the left side end 226 of the side panel 212, and a second one of the connector strips 238 can extend along a right side edge 240 of the end panel 214, as shown. The connector strips 238 can be connected to the corresponding side panel 212 and end panel 214 by bend lines 208. The connector strips 238 can be configured to attach the first packaging body 110 to the second packaging body 160 (shown in FIG. 1) during assembly of the bicycle packaging 100. In one example aspect, the connector strips 238 can be attached to the second packaging body 160 by a fastener (not shown), such as glue. In other example aspects, the connector strips 238 can attach to the second packaging body 160 by another suitable fastener know in the art, including, for example, tape, staples, and the like. Moreover, a handle opening 242 can be formed in each of the side panel 212 and the end panel 214. Example aspects of the handle openings 242 can be configured to allow the passage of a user's hand therethrough, such that the user can grip the bicycle packaging 100 to facilitate lifting or moving the bicycle packaging 100. The end panel assembly 266 can further comprise a top flap 244 and a bottom flap 246 extending from the end panel 214. Example aspects of the top and bottom flaps 244,246 can be connected to the end panel 214 at bend lines 208. As shown, according to example aspects, each of the top flap 244 and bottom flap 246 can comprise opposing side edges 248 that taper towards one another away from the end panel 214.

The top and bottom panels 216,218 of the first packaging body 110 can comprise one or more primary fasteners, such as primary tabs 250, extending therefrom. In example aspects, a pair of the primary tabs 250 can extend from the second outward edge 232 of each of the top and bottom panels 216,218. Further, a single primary tab 250 can extend from the right side edge 234 of each of the top and bottom panels 216,218. Each of the primary tabs 250 can be connected to the corresponding top and bottom panels 216,218 via a bend line 208. A pair of primary mating fasteners, such as a primary slots 252, can be defined on the end panel assembly 266. In example aspects, a first one of the primary slots 252 is formed on the top flap 244 adjacent the end panel 214, and a second one of the primary slots is formed on the bottom flap 246 adjacent the end panel 214. In other aspects, the primary slots 252 can be formed on the end panel 214. According to example aspects, each of the primary slots 252 can be configured to receive a corresponding one of the primary tabs 250 located on the right side edge 234 of the top and bottom panels 216,218.

Moreover, as shown, the end panel 214 can comprise one or more secondary fasteners, such as secondary tabs 254, extending therefrom. In example aspects, a pair of secondary tabs 254 can extend from the end panel 214, each of the secondary tabs 254 proximate to one of the primary slot 252 in the top and bottom flaps 244,246. The secondary tabs 254 can be connected to the end panel 214 via bend lines 208. A secondary mating fastener, such as a secondary slot 256, can be formed proximate to each of the primary tabs 250. For example, the secondary slots 256 can be formed at or near the bend lines 208 connecting the primary tabs 250 to the corresponding top and bottom panels 216,218. In example aspects, each of the secondary slots 256 along the right side edge 234 of the top and bottom panels 216,218 can be configured to receive a corresponding one of the secondary tabs 254. According to example aspects, a bend line 208 can extend generally horizontally across a center portion of each secondary tab 254, relative to the orientation shown, to facilitate insertion of the secondary tabs 254 into the secondary slots 256.

Example aspects of the first packaging body 110 can further comprise one or more insert indicators 258. The insert indicators 258 can be located on the inner surface 104 of the first packaging body 110. The insert indicators 258 can indicate a preferred location for placement or attachment of an insert (not shown). Example aspects of the bicycle packaging can comprise one or more inserts, such as a foam block, that can abut or engage a bicycle (not shown) received within the void 102 (shown in FIG. 2) to prohibit undesirable movement of the bicycle. The insert indicators can be formed by lines, or other indicia, printed on first packaging body 110. In other aspects, the insert indicators can be formed by scoring, a sticker label, or any other suitable method for visually indicating a preferred location for placement of an insert.

FIG. 3 illustrates an example aspect of the second packaging body 160, according to the present disclosure. The second packaging body 160 is shown in blank form, and according to example aspects, can define an inner surface 104 and an outer surface 106 (shown in FIG. 1). The second packaging body 160 can comprise a side panel 312, an end panel assembly 366, a top panel 316, and a bottom panel 318. The end panel assembly can comprise an end panel 314. The side panel 312 can comprise a top end 320, a bottom end 322, a right side end 324, and a left side end 326. The top panel 316 can extend from the top end 320, the bottom panel 318 can extend from the bottom end 322, and the end panel 314 can extend from the right side end 324. A bend line 308 can be formed at the connection of each of the end panel 314, top panel 316, and bottom panel 318 to the side panel 312 to facilitate folding of the end, top, and bottom panels 314,316,318 with respect to the side panel 312. The side panel 312 can further define an opening 342 configured to allow the passage of a user's hand therethrough. Example aspects of the side panel 312 of the second packaging body 160 can define dimensions approximately equal to the dimensions of the side panel 212 of the first packaging body 110 (shown in FIG. 2). The end panel assembly 366 can further comprise a top flap 344 and a bottom flap 346 connected to the end panel 314 by bend lines 308. Each of the top flap 344 and bottom flap 346 can comprise opposing side edges 348 that taper towards one another away from the end panel 314. In example aspects, the length $L_4$ (shown in FIG. 2) of the end panel 214 of the first packaging body 110 can be greater than a length $L_5$ of the end panel 314 of the second body 160.

As shown, example aspects of the top and bottom panels 316,318 of the second packaging body 160 can be substantially similar in size and shape to the top and bottom panels 216,218 of the first packaging body 110. Each of the top and bottom panels 316,318 can define an inward edge 328, a first outward edge 330, a second outward edge 332, a right side edge 334, and a left side edge 336. However, as shown, in example aspects, the right side edges 334 of the top and bottom panels 316,318 can be oriented at an obtuse angle with respect to the corresponding inward edge 328, and the left side edges 336 of the top and bottom panels 316,318 can be oriented at an acute angle with respect to the corresponding inward edge 328. In other aspects, the angles of the right and left side edges 334,336 with respect to the corresponding inward edges 328 can be different.

Each of the top and bottom panels 316,318 of the second packaging body 160 can further comprise a primary notch 362 formed in the left side edge 336 of each of the top and bottom panels 316,318. Moreover, a secondary notch 364 can be set within the primary notch 362. According to example aspects, when the bicycle packaging 100 is in the assembled form (shown in FIG. 14), each of the primary notches 362 can be configured to align with a corresponding one of the primary slots 253 (shown in FIG. 2) formed in the top and bottom flaps 244,246 of the first packaging body 110. Moreover, each of the secondary notches 364 can be configured to align with a corresponding one of the corresponding secondary slots 256 (shown in FIG. 2) formed along the right side edges 234 of the top and bottom panels 216,218 of the first packaging body 110. As such, the primary and secondary notches 362,364 can be configured to prevent the top and bottom panels 316,318 of the second packaging body 160 from interfering with the connection of the corresponding primary and secondary tabs 250,254 to the corresponding primary and secondary slots 252,256, respectively.

Further, as shown, a pair of primary slots 352 can be formed in each of the top and bottom panels 316,318 at or near the corresponding inward edges 328. In other example aspects, the primary slots 352 can be formed in the side panel 312 adjacent the top and bottom panels 316,318. Additionally, a pair of secondary tabs 354 can extend from the side panel 312 proximate to each of the pairs of primary slots 352. The primary slots 352 and secondary tabs 354 of the second packaging assembly 160 can be substantially similar to the primary slots 252 and secondary tabs 254 of the first packaging assembly 110 (shown in FIG. 2).

In the assembled form of the bicycle packaging (shown in FIG. 14), the primary slots 352 formed in the top panel 316 of the second packaging body 160 can be configured to receive the primary tabs 250 extending from the second outward edge 232 of the top panel 216 of the first packaging body 110. Similarly, the primary slots 352 formed in the bottom panel 318 of the second packaging body 160 can be configured to receive the primary tabs 250 extending from the second outward edge 232 of the bottom panel 218 of the first packaging body 110. Moreover, the secondary tabs 354 extending from the side panel 312 of the second packaging body 160 can be configured to engage the corresponding secondary slots 256 formed at the second outward edges 232 of top and bottom panels 216,218 of the first packaging body 110.

Figure 4:
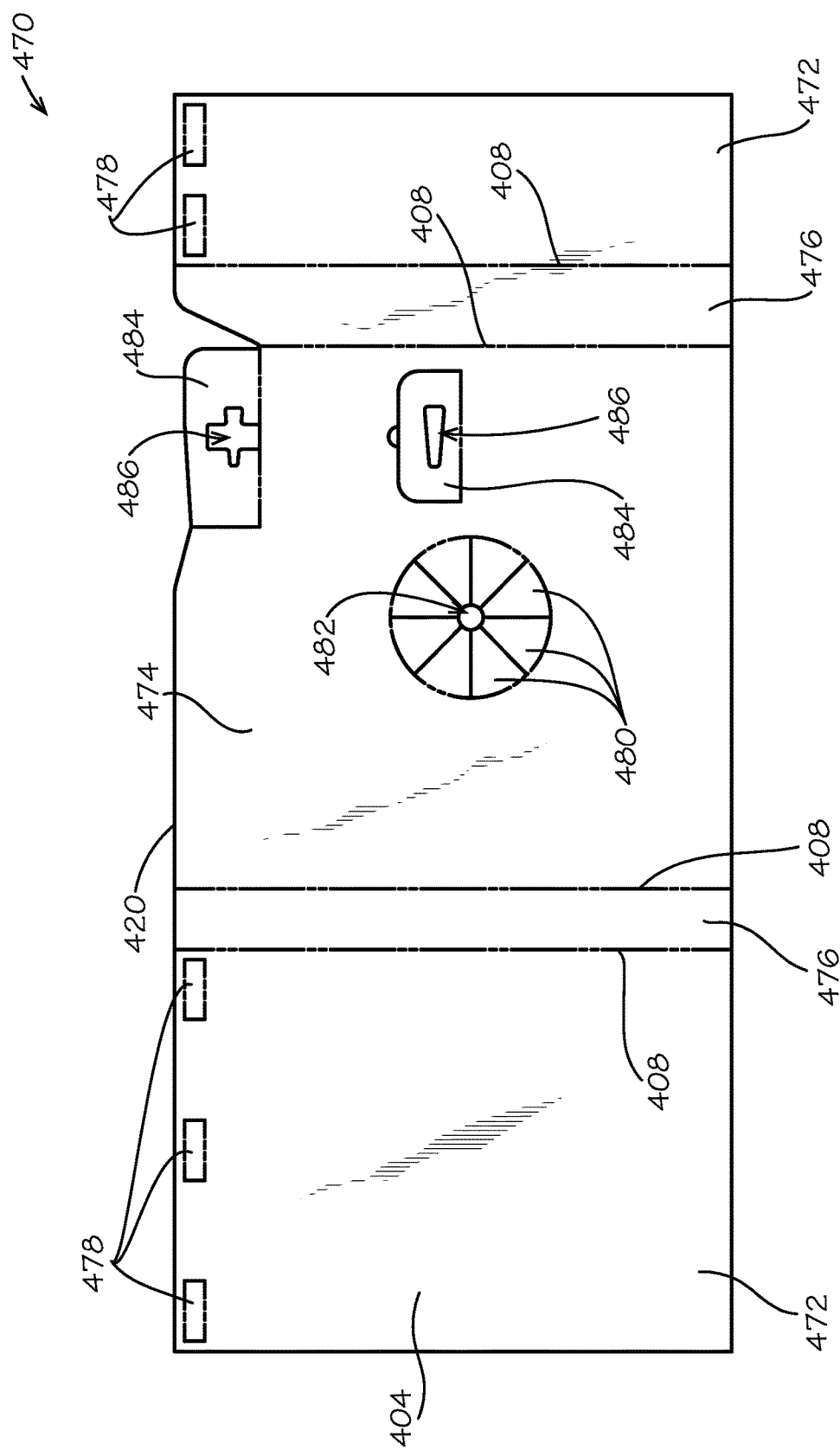
FIG. 4 is a schematic view of a wheel insert in blank form for optional use with the bicycle packaging of FIG. 1.

FIG. 4 illustrates an example aspect of the wheel insert 470 in blank form. In example aspects, the wheel insert 470 can be formed from paperboard. In other aspects, the wheel insert 470 can be formed from another suitable material known in the art, including but not limited to, metal, plastic, wood, paper, fiberboard, containerboard, and foam. The wheel insert 470 can define a back surface 404 and a front surface 406 (shown in FIG. 11). The wheel insert 470 can comprise a pair of end panels 472 and a center panel 474 between the end panels 472. The wheel insert 470 can further comprise a pair of transition panels 476. Each of the transition panels 476 can extend between the center panel 474 and a corresponding one of the end panels 472. The transition panels 476 can be connected to the center and end panels 474,472 by bend lines 408, as shown.

Further, according to example aspects, the end panels 472 of the wheel insert 470 can comprise one or more fastener indicators 478. In example aspects, such as the depicted aspect in FIG. 4, the fastener indicators 478 can be formed as printed lines generally defining a rectangular area and can be configured to indicate a preferred location for placement of a fastener (not shown). The fastener can be, for example, tape, double-sided tape, glue, staples, or another suitable fastener known in the art. In other aspects, the fastener indicators 478 can be formed as a printed word, number, or letter (e.g., "X"), a printed image (e.g., a roll of tape), or as other printed indicia. In still other aspects, the fastener indicators 478 can be formed by scoring, a sticker label, or any other suitable method for visually indicating a preferred location for a fastener.

The center panel 474 of the wheel insert 470 can comprise a plurality of generally triangular flaps 480 hingedly connected to the center panel 474 by a plurality of bend lines 408. Example aspects of the triangular flaps 480 can be generally centrally located on the center panel 474. As shown, the triangular flaps 480 can be oriented in a generally circular arrangement and can define an opening 482 extending through a center of the arrangement. According to example aspects, the opening 482 can be configured to receive a portion of a wheel axle of a bicycle (not shown). The center panel 474 can further comprise a pair of seat post tabs 484. Each of the seat post tabs 484 can be hingedly connected to the center panel 474 via bend lines 408. Example aspects of the seat post tabs 484 can be substantially vertically aligned with one another, relative to the orientation shown. Further, in an example aspect, a first one of the seat post tabs 484 can be located adjacent to the triangular flaps 480, and a second one of the seat post tabs 484 can be located proximate to a top edge 420 of the center panel 474. According to example aspects, each of the seat post tabs 484 can define an opening 486 extending therethrough. Each of the openings 486 can be configured to receive a portion of a seat post of a bicycle (not shown).

Figure 5:
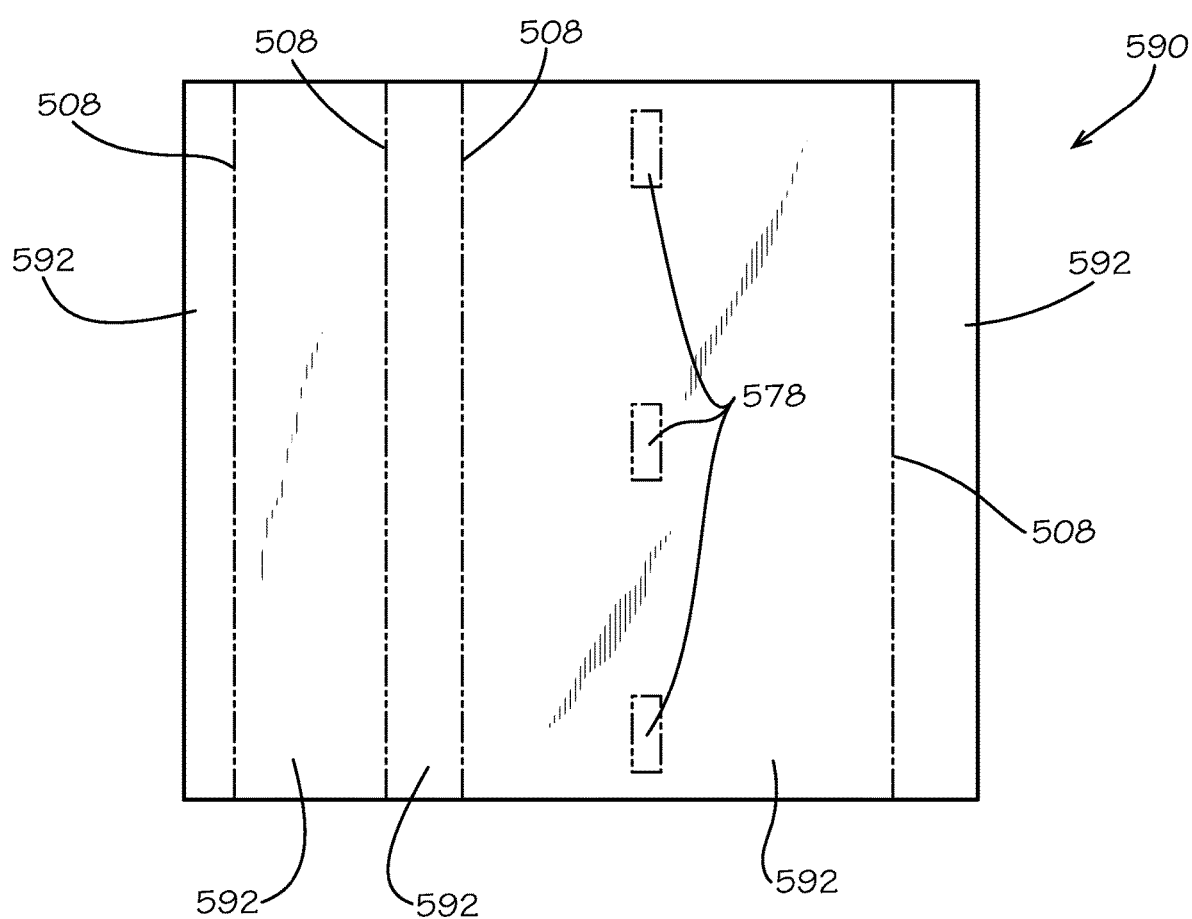
FIG. 5 is a schematic view of a derailer insert in blank form for optional use with the bicycle packaging of FIG. 1.

Optionally, the bicycle packaging 100 can comprise a derailer insert 590, an example aspect of which is shown in FIG. 5. The derailer insert 590 can comprise a plurality of panels 592 that can be connected by bend lines 508, such that each of the panels 592 can fold relative to adjacent panels 592. The derailer insert 590 can further comprise one or more fastener indicators 578 configured to indicate a preferred location for placement of a fastener (not shown). The fastener can be, for example, tape, double-sided tape, glue, staples, or another suitable fastener known in the art. Example aspects of the derailer insert 590 can be formed from paperboard, while other aspects of the derailer insert 590 can be formed from another material, such as, for example, metal, plastic, wood, paper, fiberboard, containerboard, foam, or any other suitable material known in the art.

Referring back to FIG. 1, the end panel 214 of the first packaging body 110 can be folded with respect to the corresponding side panel 212 at the bend line 208 (shown in FIG. 2) therebetween, and the end panel 314 of the second packaging body 160 can be folded with respect to the corresponding side panel 312 at the bend line 308 therebetween. To attach the first packaging body 110 to the second packaging body 160, the connector strip 238 extending from the end panel 214 of the first packaging body 110 can be coupled to the inner surface 104 of the side panel 312 of the second packaging body 160 by way of a fastener, such as glue. The other connector strip 238 (shown in FIG. 2) extending from the side panel 212 of the first packaging body 110 can be similarly attached to the inner surface 104 of the end panel 314 of the second packaging body 160. FIGS. 6-14 illustrate additional steps in an example method for assembling the bicycle packaging 100.

Figure 6:
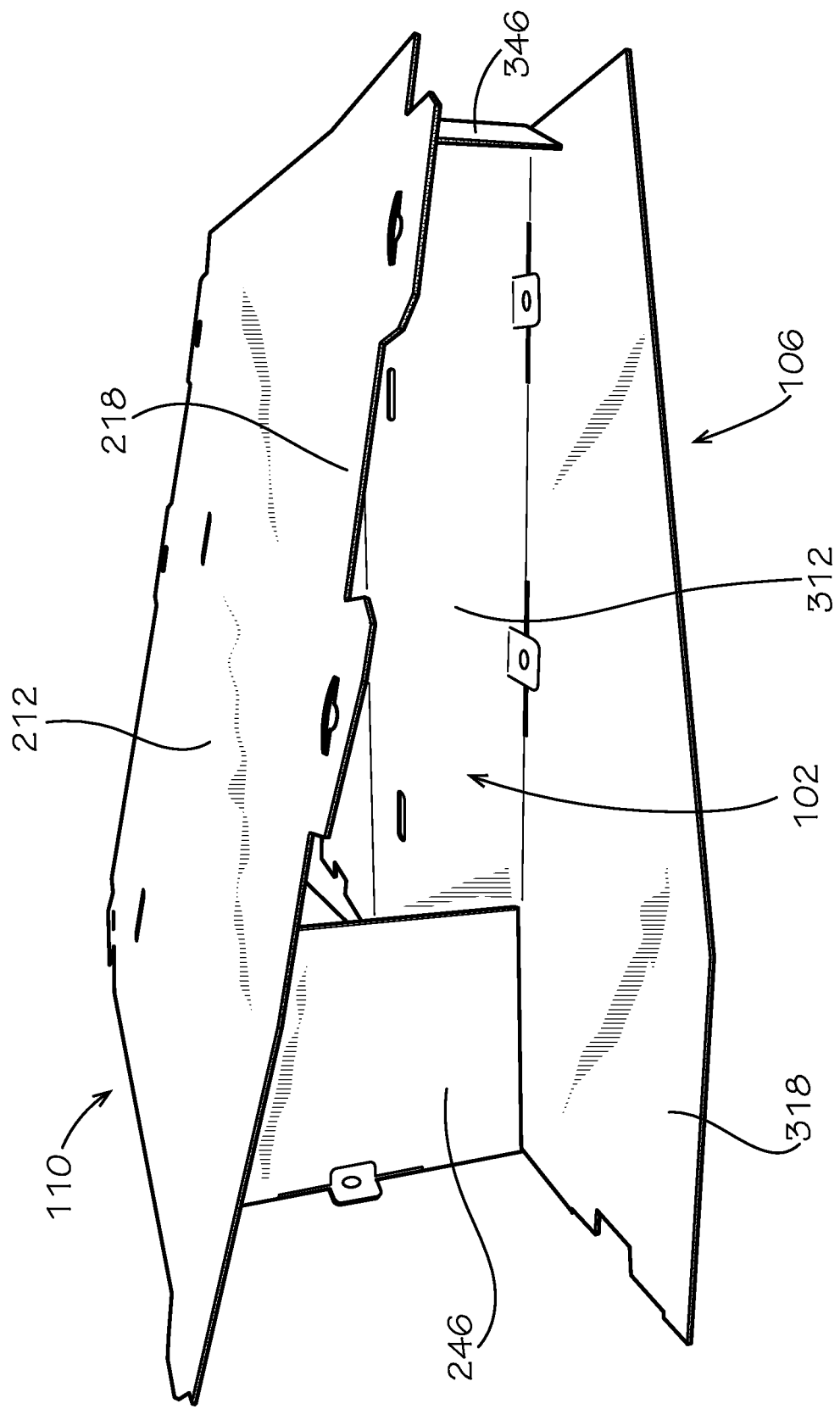
FIG. 6 is a bottom perspective view of the bicycle packaging of FIG. 1.

FIG. 6 illustrates the first packaging body 110 attached to the second packaging body 160 to define the void 102. As shown, each of the bottom flaps 246,346 can be folded towards one another and can be oriented at generally right angles with respect to the corresponding end panels 214,314 (shown in FIGS. 2 and 3, respectively). As a next step, the bottom panel 318 of the second packaging body 160 can be folded towards bottom panel 218 of the first packaging body 110, such that the bottom panel 318 can be oriented at a generally right angle with respect to the side panel 312. The bottom panel 218 of the first packaging body 110 can then be folded towards the bottom panel 318 of the second packaging body 160, such that the bottom panel 218 can be oriented at a generally right angle with respect to the corresponding side panel 212.

Figure 7:
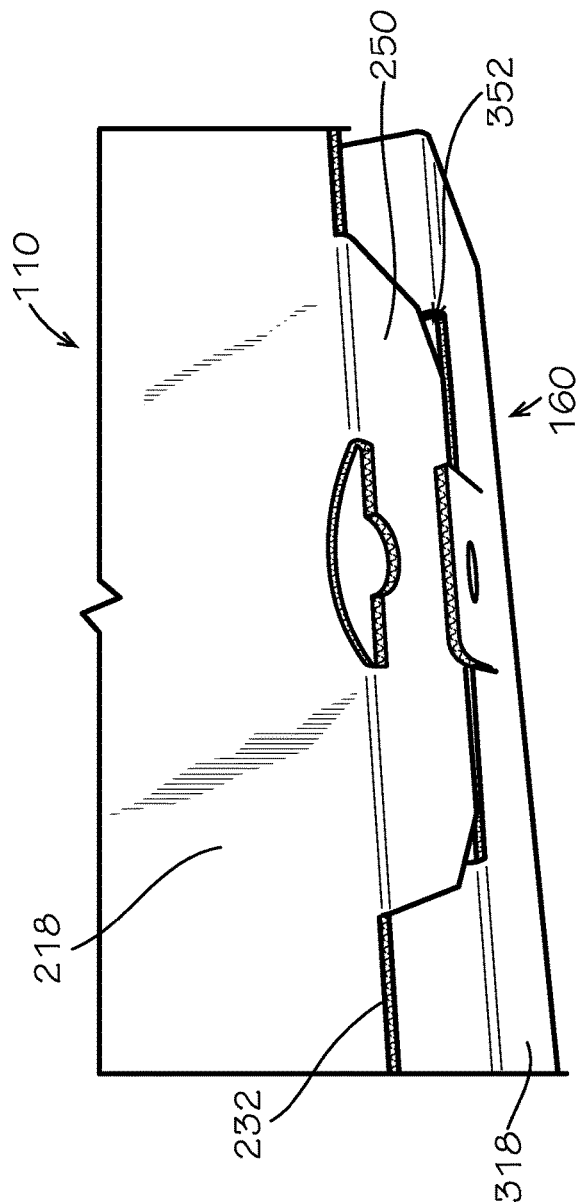
FIG. 7 is a perspective view of a primary fastener for fastening the first packaging body of FIG. 1 to the second packaging body of FIG. 1.

As shown in FIG. 7, the primary tabs 250 extending from the second outward edge 232 of the bottom panel 218 of the first packaging body 110 can be inserted into the primary slots 352 formed in the bottom panel 318 of the second packaging body 160. Moreover, the primary tab 250 extending from the right side end 224 (shown in FIG. 2) of the bottom panel 218 can be inserted into the primary slot 252 (shown in FIG. 2) formed in the bottom flap 246 (shown in FIG. 2).

Figure 8:
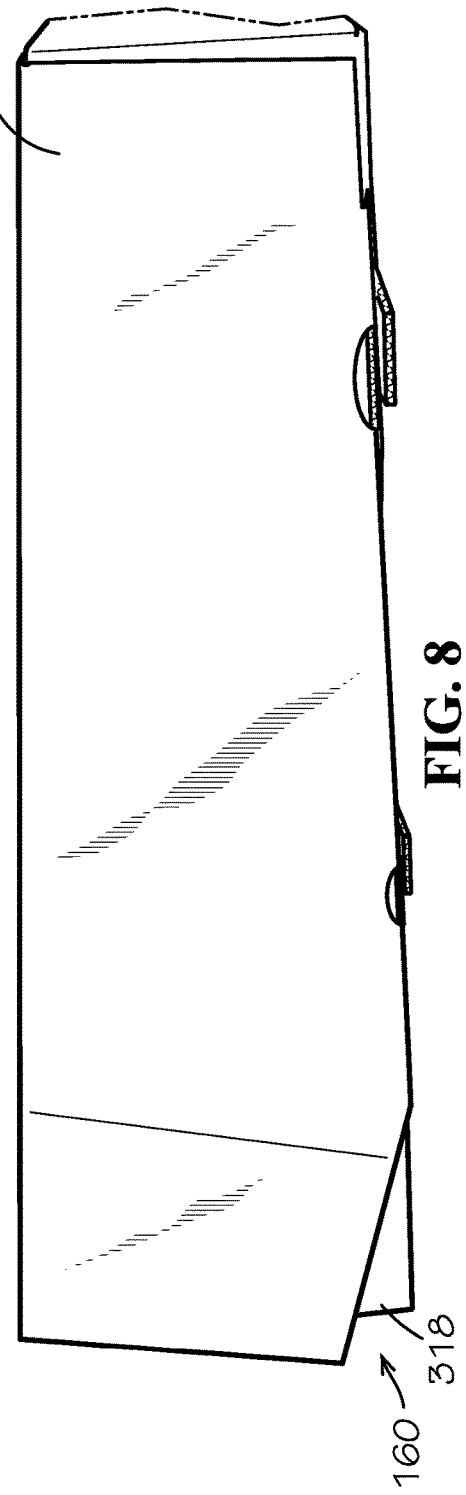
FIG. 8 is a perspective view of a secondary fastener for fastening the first packaging body of FIG. 1 to the second packaging body of FIG. 1.

FIG. 8 illustrates the bottom panel 218 of the first packaging body 110 folded towards the bottom panel 318 of the second packaging body 160, with the primary tabs 250 (shown in FIG. 2) extending from the bottom panel 218 of the first packaging body 110 aligned for insertion into the corresponding primary slots 252,352 (shown in FIGS. 2 and 3, respectively).

Figure 9:
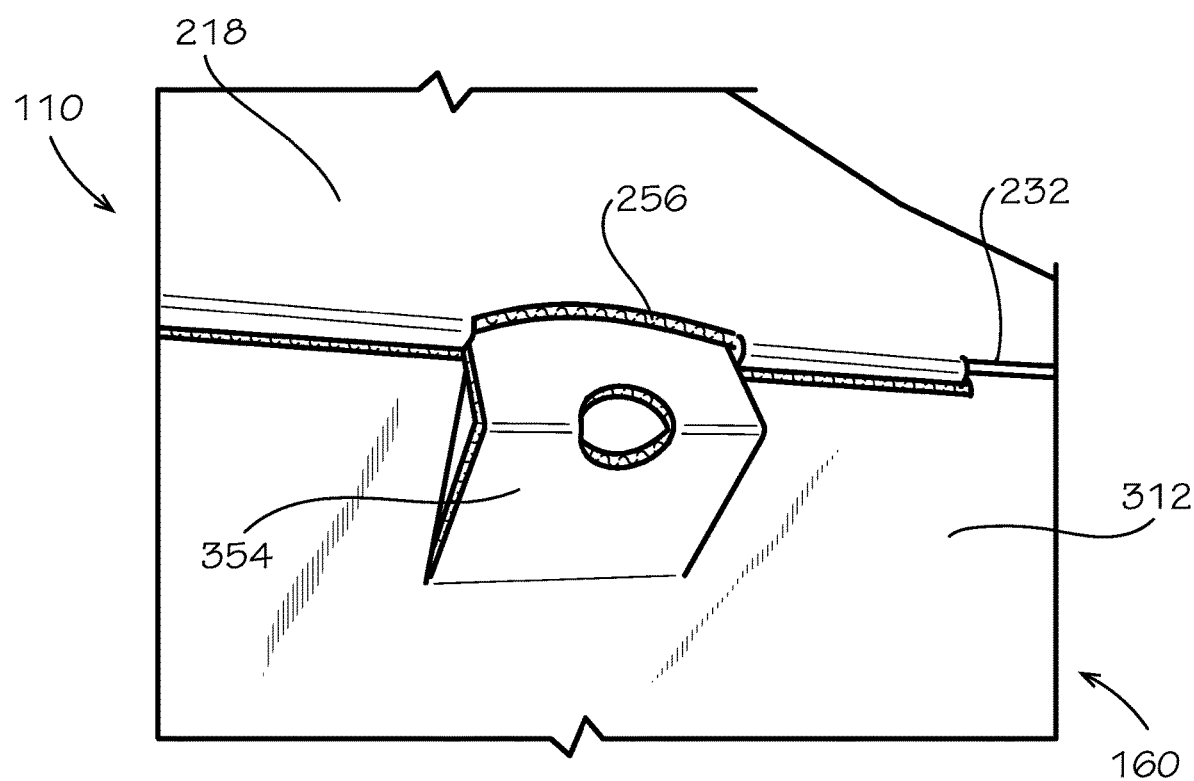
FIG. 9 is a bottom perspective view of the first and second packaging bodies of FIG. 1.

Further, as shown in FIG. 9, the secondary tabs 354 formed on the side panel 312 of the second packaging body 160 adjacent the bottom panel 318 (shown in FIG. 3) can be inserted into the secondary slots 256 formed at the second outward edge 232 of the bottom panel 218 of the first packaging body 110. Then, the secondary tab 254 extending from the end panel 214 (shown in FIG. 2) of the first packaging body 110 adjacent the bottom flap 246 can be inserted into the secondary slot 256 located at the right side end 224 (shown in FIG. 2) of the bottom panel 218. Thus, the bottom panels 218,318 of the first and second packaging bodies 110,160, respectively, can be retained in the folded configuration.

Figure 10:
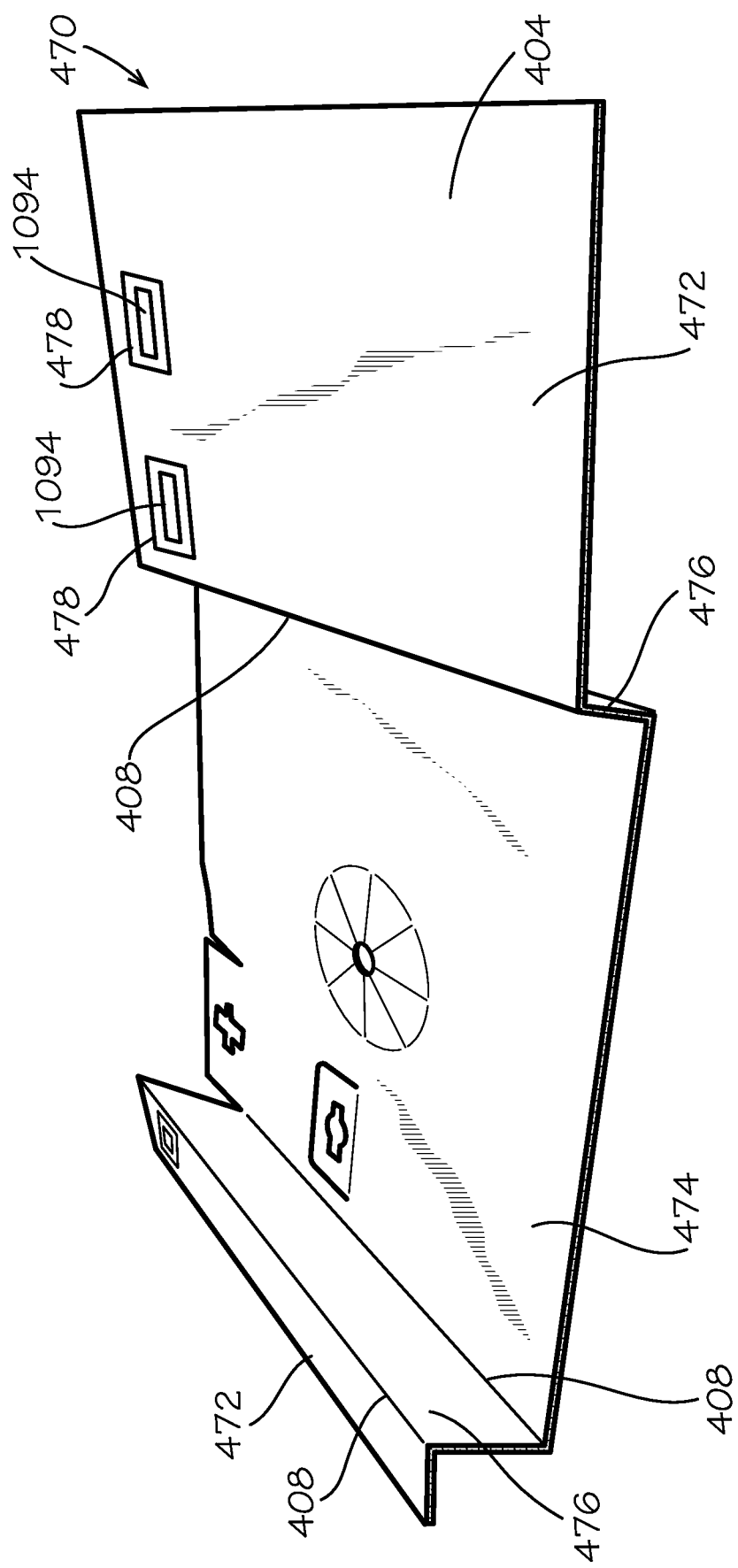
FIG. 10 is a perspective view of the wheel insert of FIG. 4.

FIG. 10 illustrates the wheel insert 470 folded at the bend lines 408 formed between the transition panels 476, center panel 474, and end panels 472. Fasteners, such as double-sided tape 1094, can be positioned at the fastener indicators 478 on the back surface 404 of the end panels 472.

FIG. 11 illustrates the wheel insert 470 assembled with the first and second packaging bodies 110,160. The double-sided tape 1094 (shown in FIG. 10) can engage the side panel 212 of the first packaging body 110 to secure the wheel insert 470 to the first packaging body 110. As shown, the end panels 472 of the wheel insert 470 can abut the side panel 212, and the center panel 474 of the wheel insert 470 can be spaced from the side panel 212, such that a gap 1196 can be defined therebetween. In example aspects, the gap 1196 can be configured to receive a wheel of a bicycle (not shown) therein. Further, as described above, an axle (not shown) of the wheel can extend through the opening 482 (shown in FIG. 4) formed at the center of the triangular flaps 480 (shown in FIG. 4). In example aspects, a next step can comprise folding the seat post tabs 484 (shown in FIG. 4) towards the side panel 312 of the second packaging body 160, such that the seat post tabs 484 can be oriented at an approximately right angle with respect to the center panel 474 of the wheel insert 470. In example aspects, each of the openings 486 (shown in FIG. 4) formed in the seat post tabs 484 can receive a portion of a seat post (not shown) of a bicycle to limit movement of the seat post within the void 102.

Figure 14:
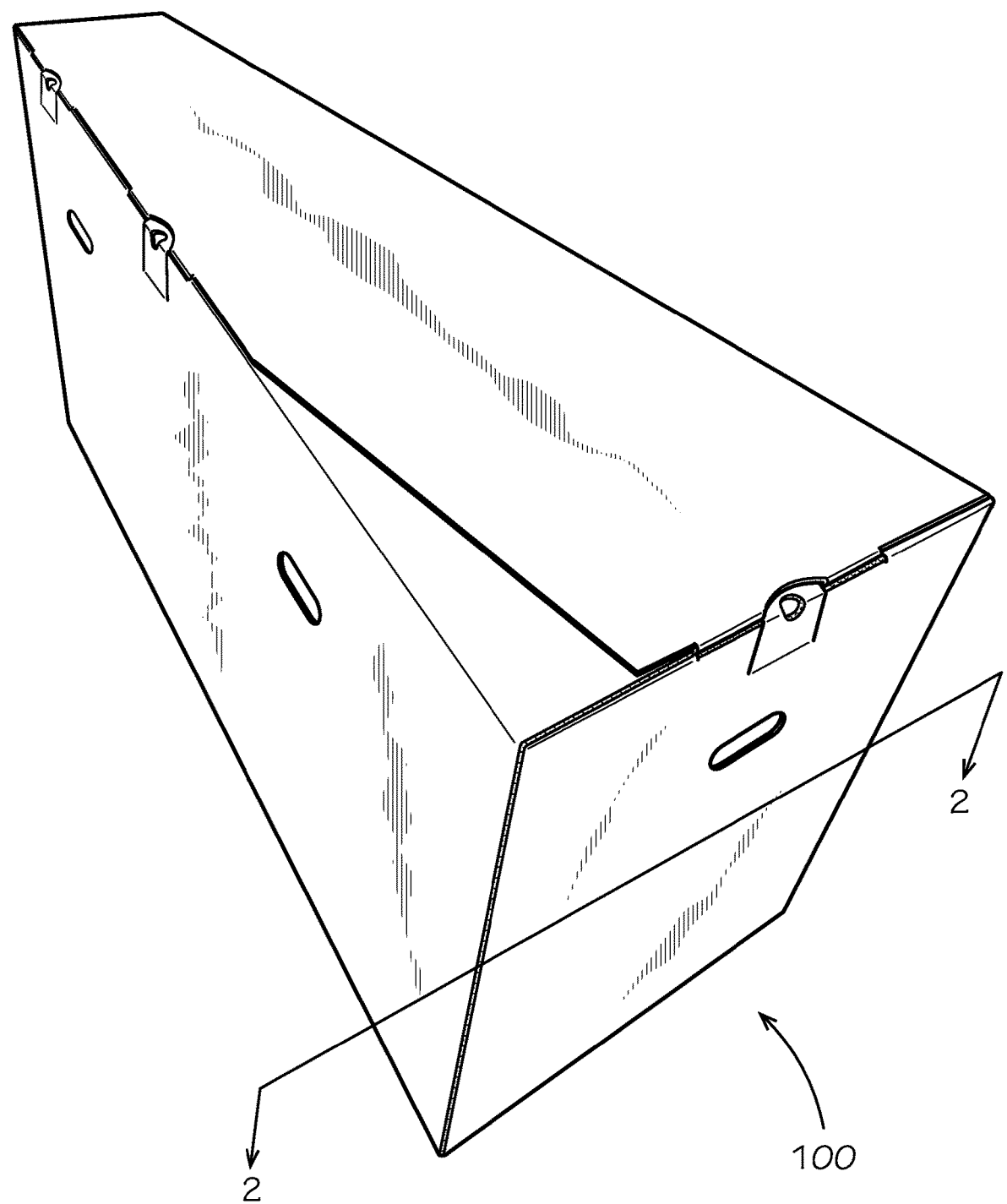
FIG. 14 is a perspective view of the bicycle packaging of FIG. 1 in the assembled form.

FIG. 12 illustrates a top, cross-sectional view of the wheel insert 470 and the derailer insert 590 folded and positioned within the void 102 of the bicycle packaging 100 taken along line 2-2 as shown in FIG. 14. Referring to the derailer insert 590, one of the panels 592 can abut the end panel 314 of the second packaging body 160 to reinforce the end panel 314. The additional panels 592 can be folded to form a wedge 1298. The wedge 1298 can fill a portion of the void 102 to limit movement of a bicycle (not shown) received in the void 102. Fasteners (not shown), such as double-sided tape, can be positioned at the fastener indicators 578 (shown in FIG. 5), and can fasten the derailer insert 590 to the inner surface 104 of the second packaging body 160. As noted above, with reference to the insert indicator 258 (shown in FIG. 2) of the first packaging body 110, the bicycle packaging 100 can comprise additional or other inserts (not shown), such as foam blocks, configured to engage or abut a bicycle (not shown) received within the void 102 to prohibit undesirable movement of the bicycle.

Figure 13:
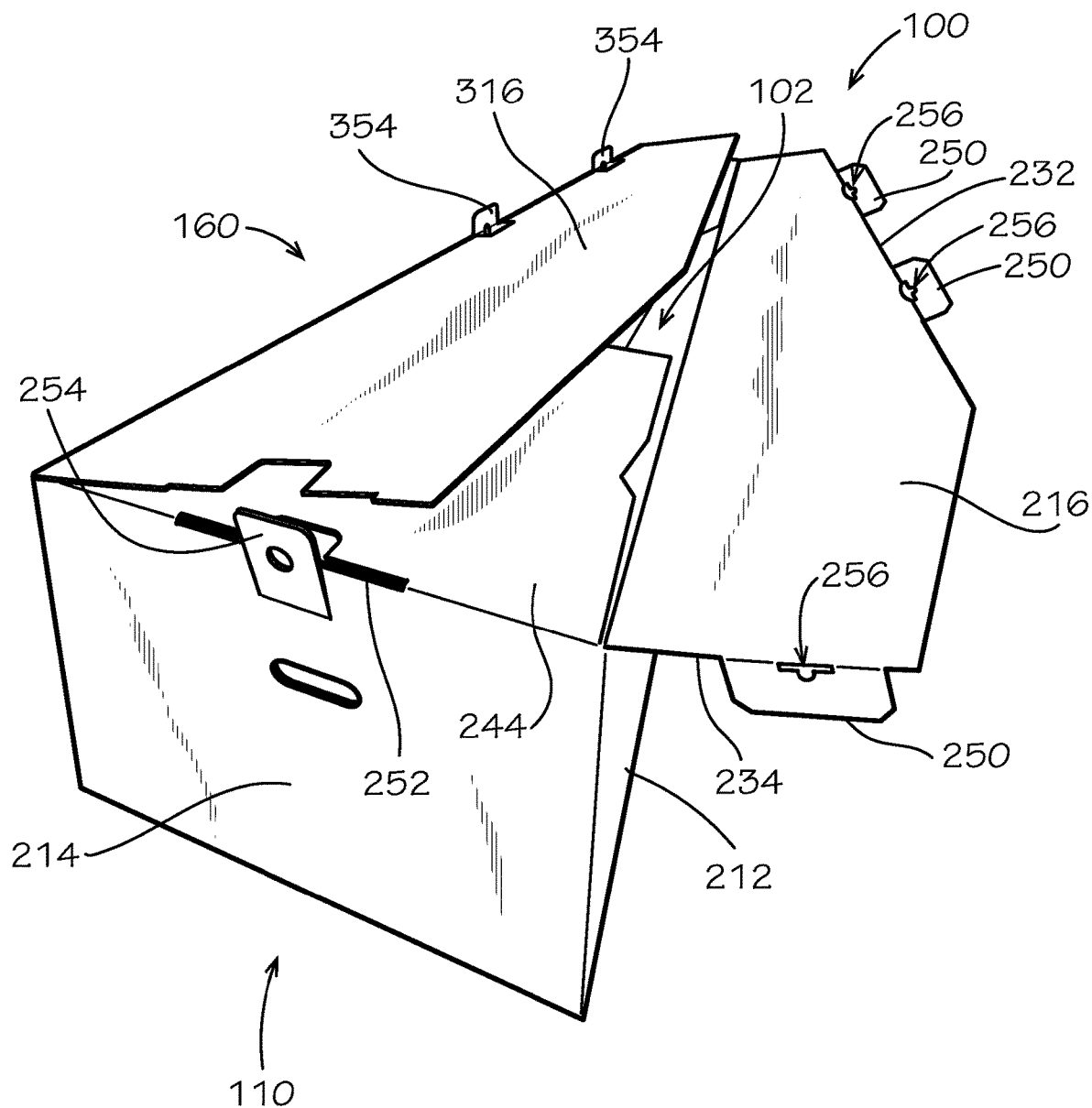
FIG. 13 is a perspective view of the bicycle packaging of FIG. 1.

As shown in FIG. 13, the top flap 244 of the first packaging body 110 can be folded with respect to the corresponding end panel 214 towards the void 102, such that the top flap 244 can be oriented at a generally right angle with respect to the end panel 214. The top flap 344 (shown in FIG. 3) of the second packaging body 160 can be similarly folded. Then, the top panel 316 of the second packaging body 160 can be folded with respect to the corresponding side panel 312 (shown in FIG. 2) towards the top panel 216 of the first packaging body 110. In a next step, the top panel 216 of the first packaging body 110 can be folded with respect to the corresponding side panel 212 towards the top panel 316 of the second packaging body 160, such that the top panel 216 of the first packaging body 110 can overlie the top panel 316 of the second packaging body 160. In example aspects, each of the top panels 216,316 can be oriented at a generally right angle with respect to the corresponding side panels 212,312, respectively.

To retain the top panels 216,316 in the folded orientation and to complete the assembly of the bicycle packaging 100, the primary tabs 250 extending from the top panel 216 of the first packaging body 110 can be inserted in the corresponding primary slot 252 formed in the corresponding top flap 244 and the corresponding primary slots 352 (shown in FIG. 3) formed in the top panel 316 of the second packaging body 160. The secondary tabs 354 formed on the side panel 312 of the second packaging body 160 adjacent the top panel 316 can be inserted into the corresponding secondary slots 256 formed at the second outward edge 232 of the top panel 216 of the first packaging body 110. Moreover, the secondary tab 254 formed on the end panel 214 of the first packaging body 110 adjacent the top flap 244 can be inserted into the secondary slot 256 formed at the right side edge 234 of the top panel 216 of the first packaging body 110. FIG. 14 illustrates the bicycle packaging 100 in the fully assembled form.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A bicycle packaging comprising:
a first packaging body formed as a first blank, the first blank comprising a first top panel, a first bottom panel, a first side panel, a primary tab, and a first end panel assembly, the first top panel connected to the first side panel at a first bend line, the first bottom panel connected to the first side panel at a second bend line opposite the first bend line, the first end panel assembly connected to the first side panel at a third bend line, the primary tab extending from an outward edge of the first top panel opposite the first bend line, a secondary slot formed at the outward edge; and
a second packaging body formed as a second blank, the second blank comprising a second top panel, a second bottom panel, a second side panel, a secondary tab, and a second end panel assembly, the second top panel connected to the second side panel at a fourth bend line, the second bottom panel connected to the second side panel at a fifth bend line opposite the fourth bend line, the second end panel assembly connected to the second side panel at a sixth bend line, the secondary tab connected to the second side panel and configured to engage the secondary slot, a primary slot formed at the fourth bend line and configured to receive the primary tab;
wherein the first end panel assembly extends from the first side panel of the first blank to the second side panel of the second blank and covers a first end of the bicycle packaging, and the second end panel assembly extends from the second side panel of the second blank to the first side panel of the first blank and covers a second end of the bicycle packaging opposite the first end.

2. The bicycle packaging of claim 1, wherein the first packaging body further defines a second primary tab extending from an outward edge of the first bottom panel and a second secondary slot formed at the outward edge of the first bottom panel.

3. The bicycle packaging of claim 2, wherein the second packaging body further defines a second secondary tab connected to the second side panel and configured to engage the second secondary slot, the second packaging body further defining a second primary slot formed at the fifth bend line and configured to receive the second primary tab.

4. The bicycle packaging of claim 1, wherein the secondary tab extends across a portion of the second side panel, the fourth bend line, and a portion of the second top panel.

5. The bicycle packaging of claim 1, wherein:
the first end panel assembly comprises a first end panel defining a first end panel length;
the second end panel assembly comprises a second end panel defining a second end panel length; and
the first end panel length is different from the second end panel length.

6. The bicycle packaging of claim 5, wherein:
the first end panel assembly further comprises a first top flap extending from the first end panel and a first bottom flap extending from the first end panel opposite the first top flap; and
the second end panel assembly further comprises a second top flap extending from the second end panel and a second bottom flap extending from the second end panel opposite the second top flap.

7. The bicycle packaging of claim 1, wherein each of the first packaging body and the second packaging body defines a handle opening.

8. The bicycle packaging of claim 7, wherein the handle opening of the first packaging body is formed in the first side panel, and the handle opening of the second packaging body is formed in the second side panel.

9. The bicycle packaging of claim 1, wherein:
at least a portion of the outward edge of the first top panel tapers away from the first end panel assembly; and
at least a portion of an outward edge of the first bottom panel tapers away from the first end panel assembly.

10. The bicycle packaging of claim 1, wherein:
at least a portion of an outward edge of the second top panel tapers toward the second end panel assembly; and
at least a portion of an outward edge of the second bottom panel tapers toward the second end panel assembly.

11. The bicycle packaging of claim 1, wherein:
a first side edge of the first top panel is oriented at an acute angle relative to the first bend line; and
a second side edge of the first top panel is oriented at an obtuse angle relative to the first bend line.

12. The bicycle packaging of claim 11, wherein the first side edge defines a first side edge length and the second side edge defines a second side edge length, wherein the first side edge length is different from the second side edge length.

13. The bicycle packaging of claim 1, wherein:
the first packaging body further comprises a second primary tab extending from a first side edge of the first top panel; and
the first packaging body further defines a second primary slot formed in the first end panel assembly and configured to receive the second primary tab.

14. The bicycle packaging of claim 13, wherein the first end panel assembly comprises a first end panel and a first top flap coupled to the first end panel at a seventh bend line, the second primary slot formed at the seventh bend line.

15. The bicycle packaging of claim 1, wherein:
the first packaging body further comprises a second secondary tab connected to an end panel of the first end panel assembly; and
the first packaging body further defines a second secondary slot formed at a first side edge of the top panel
the second packaging body further defines a secondary notch configured to align with the second secondary slot, each of the secondary notch and second secondary slot configured to receive the second secondary tab.

16. The bicycle packing of claim 1, wherein:
a first connector strip extends from the first end panel assembly, the first connector strip configured to connect to the second side panel; and
a second connector strip extends from the first side panel, the second connector strip configured to connect to the second end panel assembly.

17. A method of assembling a bicycle packaging comprising:
providing a first packaging body formed as a first blank, the first packaging body comprising a first side panel, a first end panel assembly coupled to and extending from the first side panel, a first top panel connected to the first side panel at a first bend line, and a primary tab extending from an outward edge of the first top panel distal to the first bend line;
providing a second packaging body formed as a second blank, the second packaging body comprising a second side panel, a second end panel assembly coupled to and extending from the second side panel, a second top panel connected to the second side panel at a second bend line, and a secondary tab connected to the second side panel;
engaging the primary tab with a primary slot formed at the second bend line; and
engaging the secondary tab with a secondary slot formed at the outward edge of the first top panel;
wherein the first end panel assembly extends across a first end of the bicycle packaging from the first side panel of the first blank to the second side panel of the second blank, and the second end panel assembly extends across a second end of the bicycle packaging from the second side panel of the second blank to the first side panel of the first blank.

18. The method of claim 17, wherein:
the method further comprises securing the first side panel to the second end panel assembly and securing the second side panel to the first end panel assembly.

19. The method of claim 18, wherein:
securing the first side panel to the second end panel assembly comprises connecting a first connector strip extending from the first side panel to the second end panel assembly; and
securing the second side panel to the first end panel assembly comprises connecting a second connector strip extending from the first end panel assembly to the second side panel.

20. The method of claim 17, wherein:
the first packaging body further comprises a second primary tab extending from a first side edge of the first top panel;
the first packaging body further comprises a first end panel assembly, the first end panel assembly defining a second primary slot; and
the method further comprises engaging the second primary tab with the second primary slot.

* * * * *